(12) United States Patent     (10) Patent No.: US 7,694,502 B2
Meester     (45) Date of Patent: Apr. 13, 2010

(54) SMALL SCALE TOMATO HARVESTER

(75) Inventor: David Meester, Fresno, CA (US)

(73) Assignee: Westside Equipment Co., Crows Landing, CA (US)

( * ) Notice: Subject to any disclaimer, the term of this patent is extended or adjusted under 35 U.S.C. 154(b) by 0 days.

(21) Appl. No.: 12/546,272

(22) Filed: Aug. 24, 2009

(65) Prior Publication Data

US 2010/0000194 A1     Jan. 7, 2010

Related U.S. Application Data

(63) Continuation-in-part of application No. 11/514,710, filed on Aug. 31, 2006, which is a continuation-in-part of application No. 10/942,078, filed on Sep. 14, 2004, now Pat. No. 7,581,375.

(51) Int. Cl.
*A01D 45/00* (2006.01)

(52) U.S. Cl. .................................................. 56/327.1

(58) Field of Classification Search ............... 56/327.1
See application file for complete search history.

(56) References Cited

U.S. PATENT DOCUMENTS

| 672,320 | A | 4/1901 | Ford |
|---|---|---|---|
| 2,280,364 | A | 4/1942 | Atteslander |
| 2,745,238 | A | 5/1956 | Hopkins |
| 2,757,503 | A | 8/1956 | Hart |
| 3,308,924 | A | 3/1967 | Hecox |
| 3,331,198 | A | 7/1967 | Hill |
| 3,340,935 | A | 9/1967 | Csimma |
| 3,390,768 | A | 7/1968 | Button |
| 3,413,789 | A | 12/1968 | Studer |
| 3,473,613 | A | 10/1969 | Boyce |
| 3,497,084 | A | 2/1970 | Murrah |
| 3,521,739 | A | 7/1970 | McRobert |
| 3,566,881 | A | 3/1971 | Link et al. |
| 3,584,690 | A | 6/1971 | Taylor |
| 3,613,796 | A | 10/1971 | Cayton et al. |

(Continued)

FOREIGN PATENT DOCUMENTS

CA     2272550     5/1998

(Continued)

OTHER PUBLICATIONS

FMC Foodtech—Sandei-Series SL Self-Propelled Harvester—7 pages—Italy.

(Continued)

*Primary Examiner*—Alicia M Torres
(74) *Attorney, Agent, or Firm*—Mark D. Miller (57) ABSTRACT

Machines and methods designed for use in harvesting vine-borne crops that is particularly suited for use in wet fields with narrow rows. The machines are relatively compact, and provide for vine borne crops to be severed, separated, cleaned and sorted along a straight path of a single vertical plane. The machines and methods incorporate a blower and adjustable conveyor system for efficient removal of unwanted dirt, trash, vegetation and debris from the crop without re-depositing such removed refuse on the cleaned crop. The machines and methods also provide an upward airstream that blows through the mesh/openings of the conveyors to provide agitation for recovery of additional crop from previously-shaken vines.

18 Claims, 9 Drawing Sheets

U.S. PATENT DOCUMENTS

| | | |
|---|---|---|
| 3,618,617 A | 11/1971 | Gates et al. |
| 3,656,488 A | 4/1972 | Dumanowski et al. |
| 3,666,017 A | 5/1972 | Gates et al. |
| 3,698,171 A | 10/1972 | Hecht |
| RE27,528 E | 11/1972 | Looker et al. |
| 3,916,913 A | 11/1975 | Looker et al. |
| 3,986,561 A | 10/1976 | Bettencourt et al. |
| 4,033,099 A | 7/1977 | Friedel et al. |
| 4,060,133 A | 11/1977 | Bettencourt et al. |
| 4,111,210 A | 9/1978 | Freeman et al. |
| 4,118,311 A | 10/1978 | Friedel et al. |
| 4,147,017 A | 4/1979 | Cortopassi et al. |
| 4,157,005 A | 6/1979 | Orlando et al. |
| 4,174,755 A | 11/1979 | Siri |
| 4,175,621 A | 11/1979 | Seem |
| 4,231,439 A | 11/1980 | Hall, Jr. et al. |
| 4,232,506 A | 11/1980 | Studer |
| 4,234,045 A | 11/1980 | Porter |
| 4,257,218 A | 3/1981 | McRobert |
| 4,262,477 A | 4/1981 | Turold et al. |
| 4,262,750 A | 4/1981 | Merkley et al. |
| 4,281,764 A | 8/1981 | Fowler |
| 4,282,706 A | 8/1981 | Orlando |
| 4,283,906 A | 8/1981 | Scudder |
| 4,286,426 A | 9/1981 | Orlando et al. |
| 4,294,063 A | 10/1981 | Bianchi |
| 4,329,836 A | 5/1982 | Scudder |
| 4,335,570 A | 6/1982 | Fitzmaurice |
| 4,336,682 A | 6/1982 | Orlando |
| 4,340,237 A | 7/1982 | Orlando |
| 4,341,062 A | 7/1982 | Scudder |
| 4,418,521 A | 12/1983 | Orlando et al. |
| 4,426,832 A | 1/1984 | Porter |
| 4,432,190 A | 2/1984 | Orlando |
| 4,472,928 A | 9/1984 | Easton |
| 4,498,569 A | 2/1985 | Tanaka et al. |
| 4,531,630 A | 7/1985 | Oury et al. |
| 4,569,188 A | 2/1986 | Alper et al. |
| 4,570,426 A | 2/1986 | Bettencourt |
| 4,584,826 A | 4/1986 | Bettencourt et al. |
| 4,662,162 A | 5/1987 | Bettencourt et al. |
| 4,793,128 A | 12/1988 | Creed |
| 4,893,346 A | 1/1990 | Bishop |
| 4,927,440 A | 5/1990 | Butler et al. |
| 4,965,993 A | 10/1990 | Butler et al. |
| 5,088,569 A | 2/1992 | Checcucci |
| 5,099,636 A | 3/1992 | Yoder |
| 5,103,623 A | 4/1992 | Herrett |
| 5,180,122 A | 1/1993 | Christian et al. |
| 5,197,269 A | 3/1993 | Meester |
| 5,250,801 A | 10/1993 | Grozinger et al. |
| 5,296,702 A | 3/1994 | Beck et al. |
| 5,314,071 A | 5/1994 | Christian et al. |
| 5,316,519 A | 5/1994 | Johnson |
| 5,370,579 A | 12/1994 | Brown et al. |
| 5,372,547 A | 12/1994 | Brown et al. |
| 5,480,353 A | 1/1996 | Garza, Jr. |
| 5,491,333 A | 2/1996 | Skell et al. |
| 5,495,708 A | 3/1996 | Scott et al. |
| 5,573,459 A | 11/1996 | Meester |
| 5,585,626 A | 12/1996 | Beck et al. |
| 5,647,194 A | 7/1997 | Scott et al. |
| 5,685,773 A | 11/1997 | Meester |
| 5,702,301 A | 12/1997 | Meester |
| 5,813,910 A | 9/1998 | Meester et al. |
| 5,842,334 A | 12/1998 | Slates |
| 5,860,859 A | 1/1999 | Meester |
| 5,865,675 A | 2/1999 | Meester |
| 5,895,910 A | 4/1999 | Christian |
| 5,901,539 A | 5/1999 | Sandei |
| 5,908,352 A | 6/1999 | Meester et al. |
| 5,921,074 A | 7/1999 | Scott et al. |
| 6,033,305 A | 3/2000 | Perez et al. |
| 6,257,978 B1 | 7/2001 | Meester |
| 6,298,644 B1 | 10/2001 | Sandei |
| 6,350,198 B1 | 2/2002 | Sandei |
| 6,415,592 B1 | 7/2002 | Borchard |
| 7,051,505 B2 | 5/2006 | Brannstrom |
| 2006/0053765 A1 | 3/2006 | Meester |

FOREIGN PATENT DOCUMENTS

| | | |
|---|---|---|
| DE | 4313320 A1 | 10/1994 |
| WO | WO98/21933 A1 | 5/1998 |
| WO | WO2004/006646 A2 | 1/2004 |

OTHER PUBLICATIONS

Guaresi—A complete range of hi-tech tomato harvesters G-89/93—12 pages—Italy.

Pomac—Espressioni di Tecnologia Technical Terms Linea Rossa Raccglitrici Per Pomodori Tomato Harvesters—10 pages—Italy.

Gallignani—Polaris 2000—6 pages—Italy.

SMALL SCALE TOMATO HARVESTER

This is a continuation-in-part of application Ser. No. 11/514,710 filed on Aug. 31, 2006, which is a continuation-in-part of application Ser. No. 10/942,078 filed on Sep. 14, 2004, soon to be U.S. Pat. No. 7,581,375, both of which are incorporated herein in their entirety by this reference

BACKGROUND OF THE INVENTION

1. Field of the Invention

The present invention relates to machines and methods for harvesting food crops, and more particularly, to an improved small-scale machine and related methods for separating larger volumes of vine-borne crops from their vines while effectively removing unwanted dirt, vegetation and debris, minimizing damage to the fruit itself, and promoting better sorting of fruit.

2. Description of the Prior Art

Vine-borne crops have traditionally been harvested and processed by hand. However, such manual harvesting and processing was often tedious, time-consuming and expensive.

Various machines, such as the one disclosed in U.S. Pat. No. 6,033,305, have been developed over the years to automate part, or all, of this process. These machines are able to harvest vine-borne crops from the ground at much faster speeds than humans. However, these machines were often inefficient in other aspects of the harvesting process. Early harvesting machines severed entire plants and dropped them upon the ground, with the desired crops remaining affixed to the plants. Then, collection devices would retrieve the mixture of vegetation, dirt and debris for processing. Human sorters would then be required to sort through the mixture to separate the crops from the rest, and extract the former. The human sorters had to quickly process these mixtures to prevent a backlog. As a result, some suitable crops were lost because they were too far entangled within the plants, or simply overlooked by the human sorters.

Various devices have been developed over the years to improve the mechanized harvesting process, and to minimize the need for human sorters. For example, U.S. Pat. Nos. 4,257,218, 4,335,570, and 6,257,978 all disclose harvesting machines utilizing at least one form of agitating device (such as vibrating shaker heads or conveyor belts) to dislodge tomatoes from the vines. Several harvesting machines, such as those disclosed in U.S. Pat. Nos. 6,257,978 and 6,033,305, also utilize forced air pressure systems to further remove dirt and debris.

Unfortunately, larger is not always better. While wider and larger machines are generally capable of harvesting and processing a higher volume of vine-borne crops, many road and/or field situations make it impossible or impracticable to use or bring these large machines in to perform the desired harvesting. Such machines are also more difficult to maneuver. Such limited maneuverability may require the machine operator to spend additional time repositioning the machines to process each row of crops, or cause the machines to inadvertently trample one or more rows. In addition, larger machines tend to weigh more, and the added weight not only affects maneuverability (e.g. turning), it also makes the larger, heavier machines unusable in moist or muddy fields where they tend to bog down. It is therefore desirable to provide a smaller scale machine that is capable of harvesting larger volumes of vine-borne crops.

In addition, the design of many existing large and small-scale machines may cause damage to the fruit by imparting numerous drops and/or turns during processing. Many machines require the fruit to drop a distance of several feet over the course of processing through the machine, and to make several turns during the process. Each drop and each turn provides another point where the fruit may be damaged, so it is desirable to minimize the number and/distance that the fruit drops through the machine, and to minimize the number of turns the fruit makes as it travels through the machine.

Effective separating and sorting of harvested fruit is also important. More efficient removal of dirt, vegetation, trash and debris as well as more accurate sorting of fruit is possible when the harvested materials are widely dispersed, and not bunched together. Another unfortunate side effect of machines in which the fruit makes multiple turns is that the fruit and associated trash and debris tends to bunch together. Rather than the fruits being evenly spaced upon the conveyors (so that they may be easily examined and processed), these comers cause the fruits to become crowded as they are transported onto an intersecting conveyor sometimes forming windrows, making them more difficult to inspect and sort. This bunching makes removal of the trash and debris more difficult, and once removed, the bunching of the harvested fruit makes sorting more difficult as well. Furthermore, each turn involves a drop from one conveyor to another, risking additional damage to the fruit, and requiring more maintenance and cleanup from breakage. Transverse turns also tend to increase the overall width and size of the harvester machine. All of these consequences make it even more desirable to minimize the number of turns the fruit makes as it travels through the machine.

Several variations of cleaning systems for removal of dirt, vegetation, trash and debris have been implemented in existing machines, each with their own drawbacks. Suction fan systems used on some harvesting machines tend to be expensive, noisy, prone to plugging in wet conditions, at times unreliable, and need significant power. Many machines developed to harvest tomatoes in wetter climates do not utilize suction fans on the harvester for these reasons. Machines which use only a blower for removal of dirt, vegetation, trash and debris suffer from problems related to inadequate space for the air to vent and drop out this refuse, making it difficult to control where all the refuse is going. In many cases, the refuse winds up settling back onto the freshly harvested crop, defeating the purpose of the cleaning blower. On some foreign machines, this problem is solved by placing the blower at the rear of the machine, allowing the blown refuse to vent out the rear. However, it is preferable to be able to clean the crop before it reaches the rear of the machine, to allow room for manual and electronic sorting at the rear of machine. Otherwise, the crop stream would need to change directions in order to come back up the side of the machine for sorting. This would add to the width and bulk of the machine, making it larger and less maneuverable.

It is therefore desirable to provide a small-scale vine-borne crop harvesting machine capable of processing a large volume of crops that is usable in narrow, wet field situations where larger machines would bog down. It is further desirable that dirt, vegetation, trash and debris be effectively removed early in the harvesting process so that the sorting of crop on the machine may be accomplished at or near the rear, to avoid adding width and bulk to the machine.

SUMMARY OF THE INVENTION

The present invention provides a compact crop-vine harvester and separation system that includes machines and related methods for harvesting vine-borne crops. The machines are relatively compact, having a frame that is dimensioned such that its width is substantially the same as the wheel or track base so that it may travel on narrow roads, and be used in narrow, wet field conditions. The machines provide for vine borne crops to be severed, separated, cleaned and machine-sorted along a single vertical plane (straight line). The machines incorporate a unique blower system for efficient removal of unwanted dirt, vegetation, trash and debris without reintroducing such refuse onto the harvested crop.

In several embodiments, a severing device is provided at the forward end of a machine for severing crop-laden vines from the ground. In these embodiments, a first conveyor (sometimes referred to herein as a "header") is provided that brings the severed crop-laden vines to an upper position in the machine. The severed crop-laden vines cross an adjustable gap and are delivered onto a transfer conveyor (sometimes referred to herein as an "upper header"), the gap allowing loose dirt and debris to fall through the machine to a dirt removal cross conveyor. The material on this conveyor is passed through a vision system which identifies and returns the red crop back onto the machine as the dirt and debris pass through to the ground. The crop-laden vines are then introduced into a rotating shaker having tines that engage and loosen the vines, causing the crop to be dislodged as it shakes. The dislodged crop drops onto a second conveyor (sometimes referred to herein as a "fruit" conveyor) below the shaker, and the vines are deposited onto a third conveyor (sometimes referred to herein as a "recovery" conveyor) located above the fruit conveyor and extending beyond toward the rear of the machine.

The fruit conveyor is located along a lower region and extends under the shaker in embodiments of the machines of the present invention, to transport the dislodged crop rearward to a sorter. Meanwhile, the vines deposited on the recovery conveyor are transported rearward for a distance above the fruit return conveyor. The recovery conveyor is provided with large slots or a belted chain having a wider pitch so that crop can pass through, and drop onto the fruit return conveyor below it. Each of these conveyors is lined up along the same vertical plane, so that the crop and related materials remain widely dispersed across the width of the conveyors.

In most circumstances, some amount of dirt, debris, trash and vegetation is usually deposited on the second (fruit) conveyor along with the dislodged crop. To remove this remaining refuse, the second conveyor transfers the fruit over an adjustable gap between the second and fourth conveyors in which a strong upward air flow is provided through a nozzle attached to a blower The blower may be provided at any suitable location and provided with ducting, if necessary, to direct the airflow through the gap. The nozzle extends along the width of the second (fruit) conveyor and blows air in an upward direction that is angled with respect to the fruit conveyor itself so that all crop and refuse is affected thereby. The airflow may be adjusted in one or two different ways: by adjusting the speed of the blower, and/or by adjusting the angle at which the airflow contacts the underside of a fourth conveyor (sometimes referred to as the "fruit return" conveyor). The fruit return conveyor is located between the sorter conveyor and the recovery conveyor, and above a refuse removal surface, along the same plane as those conveyors.

The airflow should be strong enough to blow away all loose dirt, debris, trash and vegetation without blowing away the crop itself In preferred embodiments, the airflow should also be strong enough to blow through the fourth (fruit return) conveyor and provide agitation to the vines located above on the third (recovery) conveyor in order to further dislodge crop from the vines located thereon.

Any crop dislodged by the action of the airflow on the vines on the recovery conveyor drops through the large gaps in the recovery conveyor to the fruit return conveyor directly below the recovery conveyor The fruit return conveyor travels in a direction opposite from that of the recovery conveyor, and brings any such dislodged fruit back to the second (fruit) conveyor, where it joins other fruit and passes over the airflow gap. In order to avoid the removed refuse from being redeposited onto the crop, it is important that the refuse-laden air be able to escape from embodiments of the machines of the present invention. This is accomplished by first making sure that there is no blockage between the third (recovery) and fourth (fruit return) conveyors which could be caused by, for example, a portion of a skid plate; and second by providing the third and fourth conveyors with sufficiently wide mesh or gaps to allow air to easily pass through. The openings/gaps in the fourth/lower (fruit return) conveyor may be of any suitable size, but are preferably between about 28 mm and about 36 mm; the openings/gaps in the third/upper (recovery) conveyor may be of any suitable size, but are preferably of a size between about 84 mm and about 120 mm. In a preferred embodiment, the openings in the fruit return conveyor are about 32 mm wide, and those in the recovery conveyor are about 84 mm wide.

The cleaned crop that passes across the airflow gap is then deposited onto a fifth conveyor (sometimes referred to as the "sorter" conveyor) that is also in line with the four previous conveyors. The fifth conveyor takes the fruit to a sorting area, where the crop may be hand sorted, or be sorted using one or more automatic units which kick out unwanted fruit according to programmed instructions. Since the crop has not traveled through any turns up to this point, it remains evenly separated on the fourth conveyor thereby improving the sorting process. Then, in some embodiments, the crop makes a turn where it may be deposited onto a transversally oriented conveyor. Here, hand sorting may be performed, followed by deposit of the crop onto a final conveyor which takes it up, out and deposits it into a waiting hopper alongside the machine. In alternative embodiments, the transversally oriented conveyor and the final conveyor are one and the same, making the crop available for sorting and then elevating it out of the machine to the hopper waiting alongside.

In some embodiments, a continuously rotating roller is provided adjacent to the airflow to catch any large pieces of vegetation or trash and deposit them on the refuse removal surface located above the fourth sorter conveyor. The roller itself is preferably smooth so that it does not become entangled with the vegetation or trash, but it may be provided with teeth, lagging, textured covering or tines to engage such materials if so desired. The roller may rotate in either direction, but preferably in harmony with the airflow so as to remove large pieces of refuse moving toward the rear of the machine where they are deposited on the refuse removal conveyor. The refuse removal conveyor is textured so that the large pieces of refuse landing on it convey out to one or both sides of the machine and drop to the ground. In some embodiments, a back plate is provided to prevent airborne refuse from settling back onto the cleaned crop.

It is therefore an object of the present invention to provide machines and methods for harvesting vine-borne crops in which the harvested crop travels along a path within a machine for separation of crops from vines, the separated crop being cleaned using an upwardly blowing airflow that passes through the fruit stream and vents the air through two conveyors with the refuse being deposited on a cross conveyor.

It is also an object of the present invention to provide machines and methods for harvesting vine-borne crops in which the vines from which crop is being dislodged are agitated using an upwardly blowing airflow that passes through the conveyor upon which the vines have been deposited.

It is also an important object of the invention to provide machines and methods for harvesting vine-borne crops in which the harvested fruit is widely dispersed as it is conveyed through a machine to facilitate better removal of unwanted materials from the crops, and to facilitate better sorting of fruit.

It is also an important object of the invention to provide machines and methods for harvesting vine-borne crops in which unwanted dirt, vegetation, trash and debris is removed through the action of an adjustable lower blower device and an adjustable conveyor carrying dislodged crop.

It is also an important object of the invention to provide machines and methods for harvesting large volumes of vine-borne crops that may be deployed in wet vineyards and fields where larger machines would be bogged down.

It is also an important object of the invention to provide improved methods for harvesting and cleaning wet, damp or moist vine-borne crops.

Additional objects of the invention will be apparent from the detailed descriptions and the claims herein.

DETAILED DESCRIPTION

Figure 1:
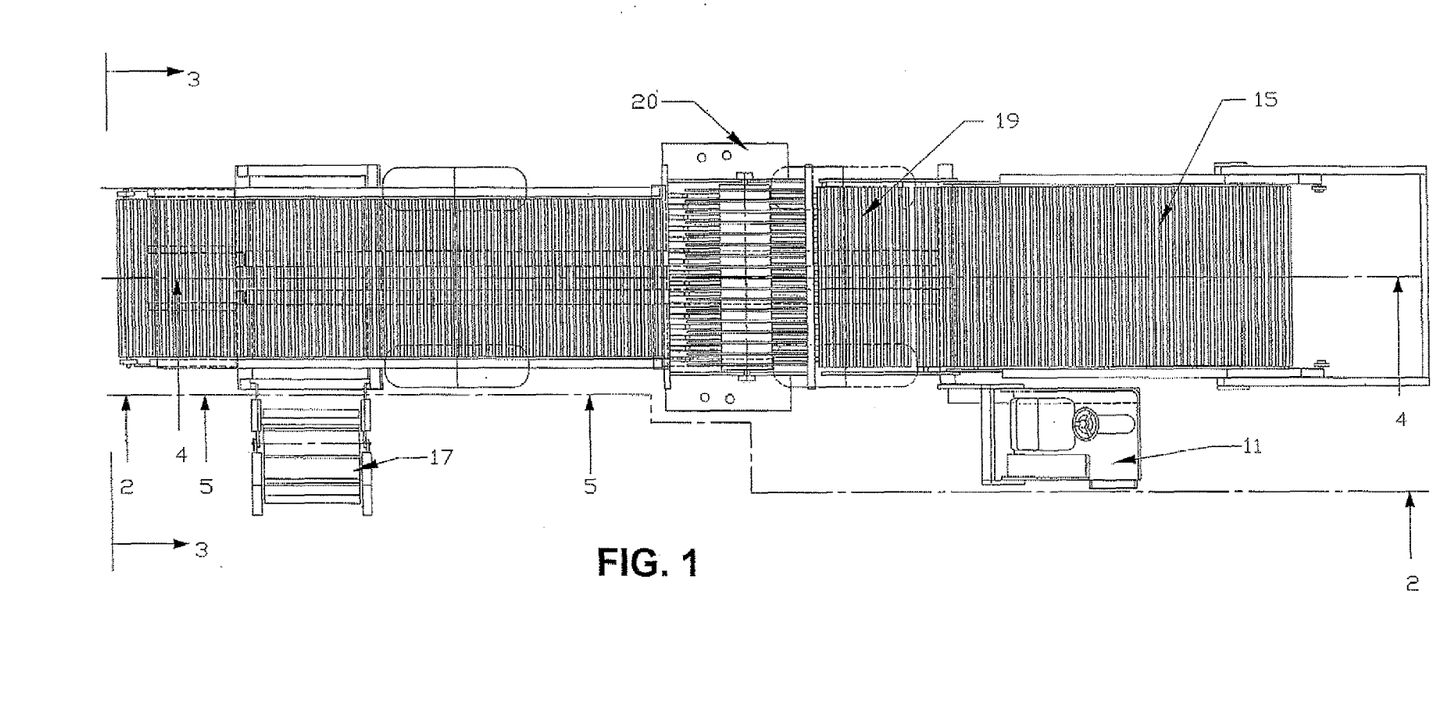
FIG. 1 is a top view of an embodiment of the present invention.
Figure 2:
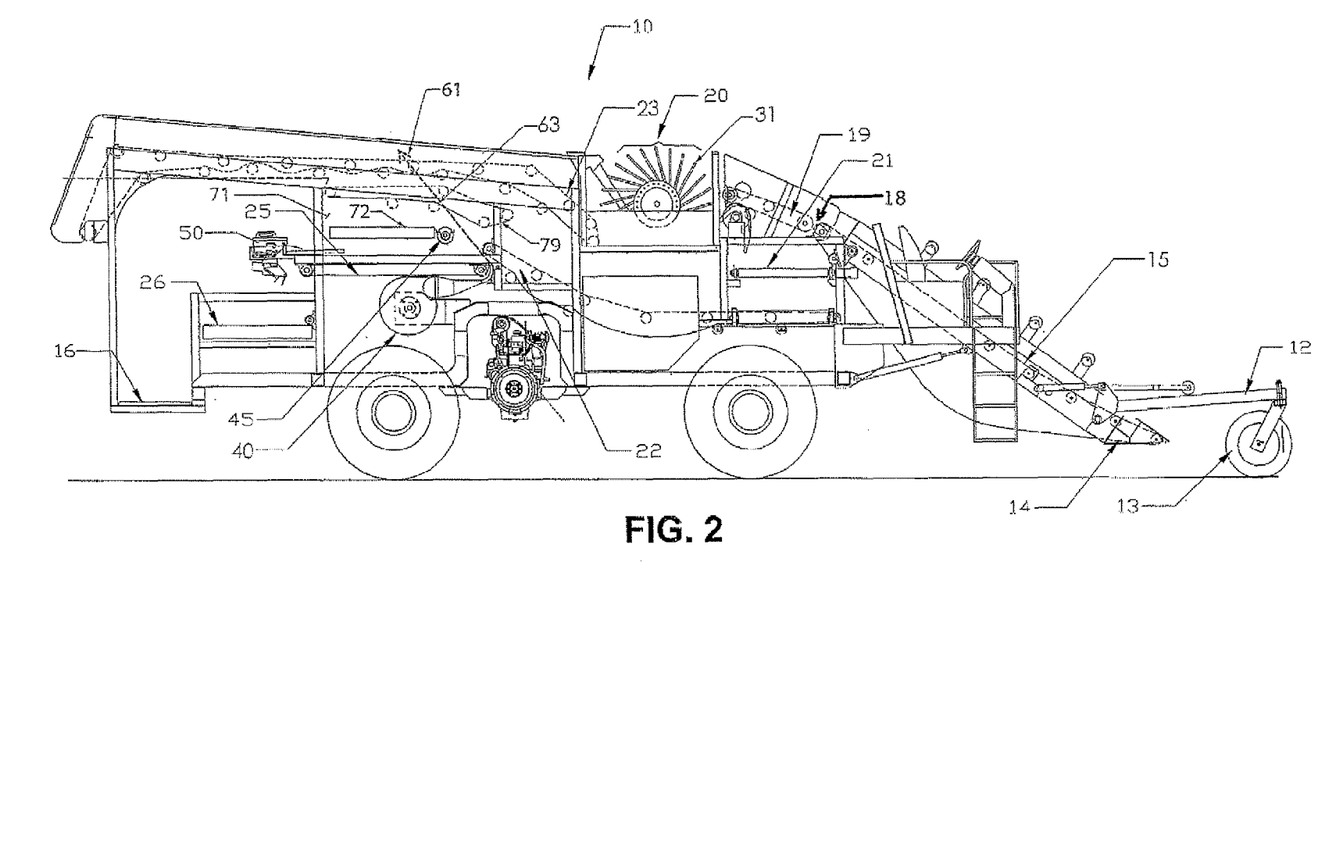
FIG. 2 is a side view of an embodiment of the present invention along line 2-2 of FIG. 1.

Referring to the drawings wherein like reference numerals designate like or corresponding parts throughout the several views, and referring particularly to FIGS. 1 and 2, it is seen that the illustrated embodiment of the invention includes an apparatus for harvesting above-ground food plants grown in rows. The exterior components of the exemplary apparatus generally comprise a self-propelled vehicle body 10 having a driving compartment 11, an adjustable arm 12 with a pickup device 14 and conveyor 15, a separator 20, a sorting platform 16, and a discharging chute 17.

Figure 3:
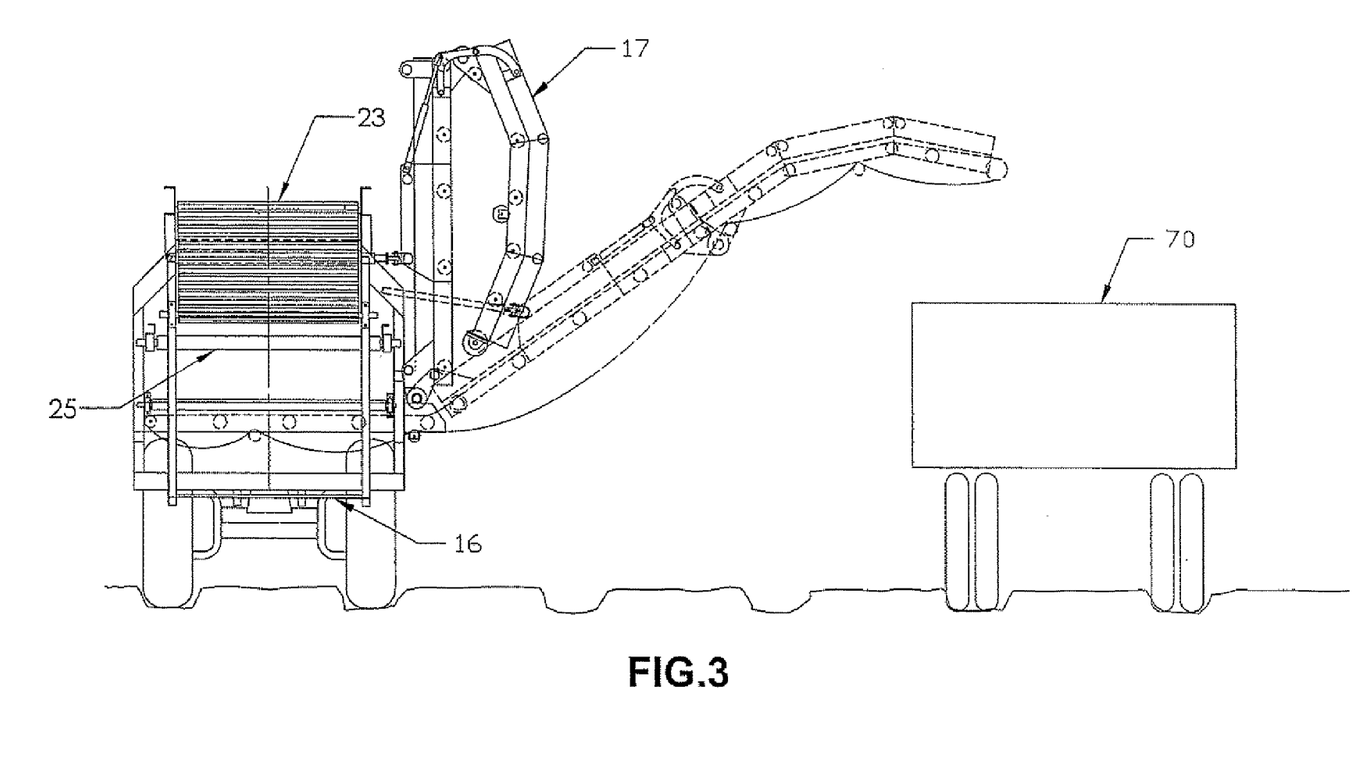
FIG. 3 is a rear view of an embodiment of the present invention along line 3-3 of FIG. 1.

As shown in the illustrated exemplary embodiment of FIG. 2, an adjustable arm 12 is affixed to the front end of the vehicle body 10. The adjustable arm 12 may be any number of commercially available devices that allow the operator to adjust the position of the arm 12 relative to the ground, said position depending upon the characteristics of the particular crop harvested or its environment. A gage wheel 13 for height adjustment is mounted at the front end of the adjustable arm 12. A pickup device 14 may be any commercially available device capable of severing vines V at or near ground level, such as a cutting disc or plurality of opposing blades, and a lift for placing the severed vines onto conveyor 15. Pickup conveyor 15 is an endless longitudinal conveyor belt traveling in a rearward direction into the separator 20. An optional sorting platform 16 may be affixed to the rear end of the vehicle body 10. Platform 16 allows one or more humans to examine and hand sort the crop, such as tomatoes T, on a conveyor 26 before they are passed along to a discharging chute 17. Chute 17 is depicted in the rear view of FIG. 3 in its retracted position, with phantom lines showing its extended position over a receiving hopper in an adjacent row.

An endless motor-driven longitudinal receiving conveyor 19 is adapted to receive the vines V from the exterior pickup conveyor 15 in this exemplary embodiment. The receiving conveyor 19 travels toward the rear end of the vehicle body 10. An adjustable gap 18 is provided between the pickup conveyor 15 and receiving conveyor 19, said gap 18 allowing loose crop (in this example tomatoes T), dirt clods and other debris to drop from the vines V while said vines travel between the two conveyors 15 and 19. It is to be appreciated that the width of gap 18 may be varied to account for different sizes of vines V, tomatoes T, dirt clods and debris. It is to be appreciated that although these descriptions refer to tomatoes T, the systems, machines, apparatus and methods of the present invention may be used with any vine-borne crop.

In most embodiments, a shaker brush 20 is positioned for receiving crop-laden vines from receiving conveyor 19. The shaker brush 20 may be any commercially available brush comprising a plurality of tines 31 and an agitating mechanism (not depicted) for concurrently rotating and/or vibrating the shaker brush 20, such as, without limitation, an eccentric weight assembly or vibrating motor. Brush 20 is rotatable along a central axis in a downward direction, causing the vines V to be pulled underneath the shaker brush 20 toward the rear end of the vehicle body 10. The vibratory force of the shaker brush 20 is sufficient to dislodge the majority of the crop of tomatoes T from their vines V, along with most remaining dirt clods and debris, without excessively damaging the tomatoes T.

Figure 4:
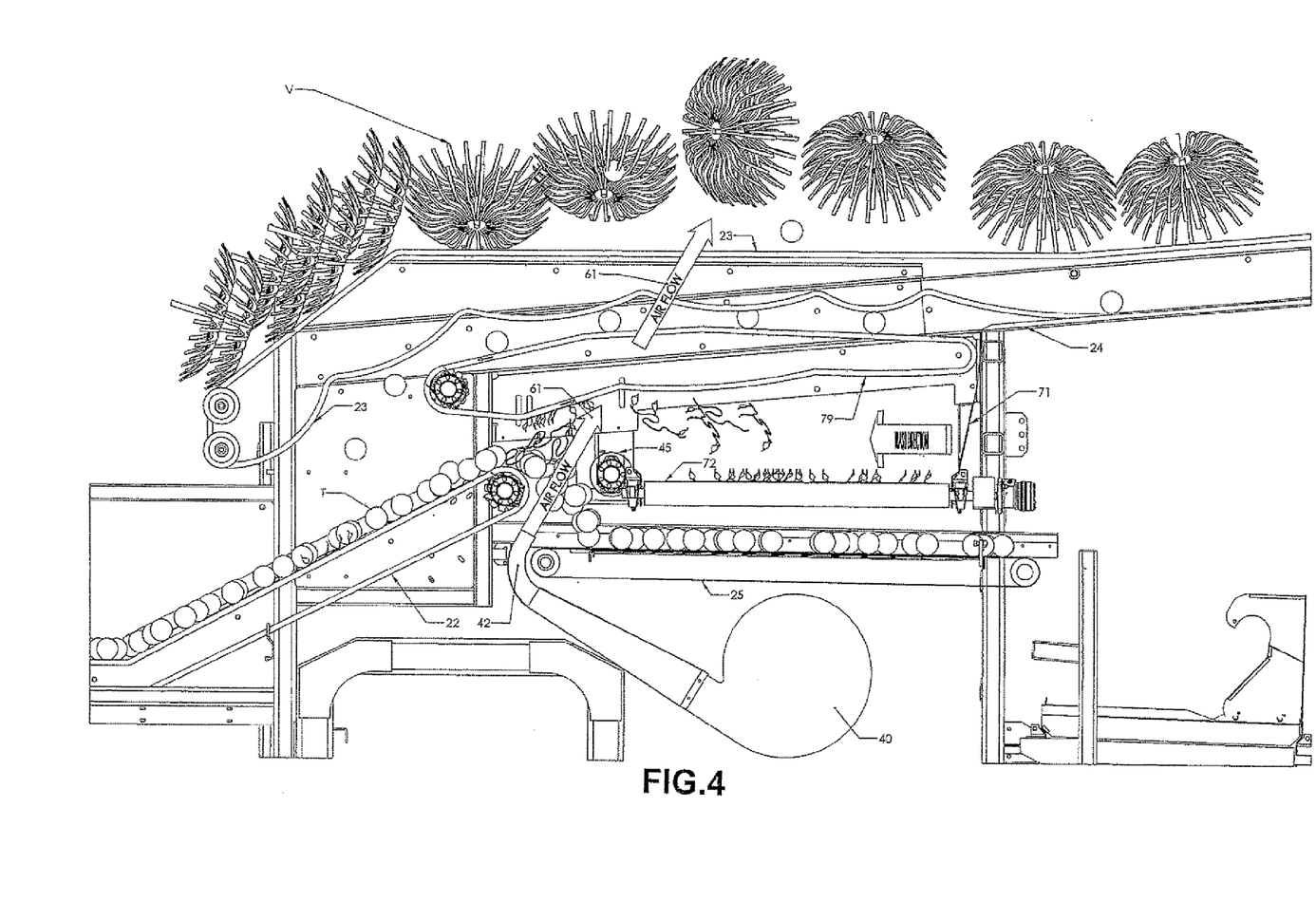
FIG. 4 is a detailed cut away side view along line 4 of FIG. 1 illustrating the major operative elements of an embodiment of a cleaner of the invention.

As shown in FIG. 4, which is a left side view of the illustrated exemplary embodiment, the dislodged tomatoes T, and an inevitable quantity of unwanted dirt, trash, vegetation and debris, are dropped onto a lower fruit conveyor 22, while the vines V (along with any tomatoes T still lodged therein) are deposited upon an upper recovery conveyor 23. Fruit conveyor 22 moves the dislodged tomatoes T, and the associated dirt, trash, vegetation and debris rearward in the machine across an air gap 28 for cleaning, then onto a sorter conveyor 25 which conveys the tomatoes T to a sorting area at the rear.

Figure 5A:
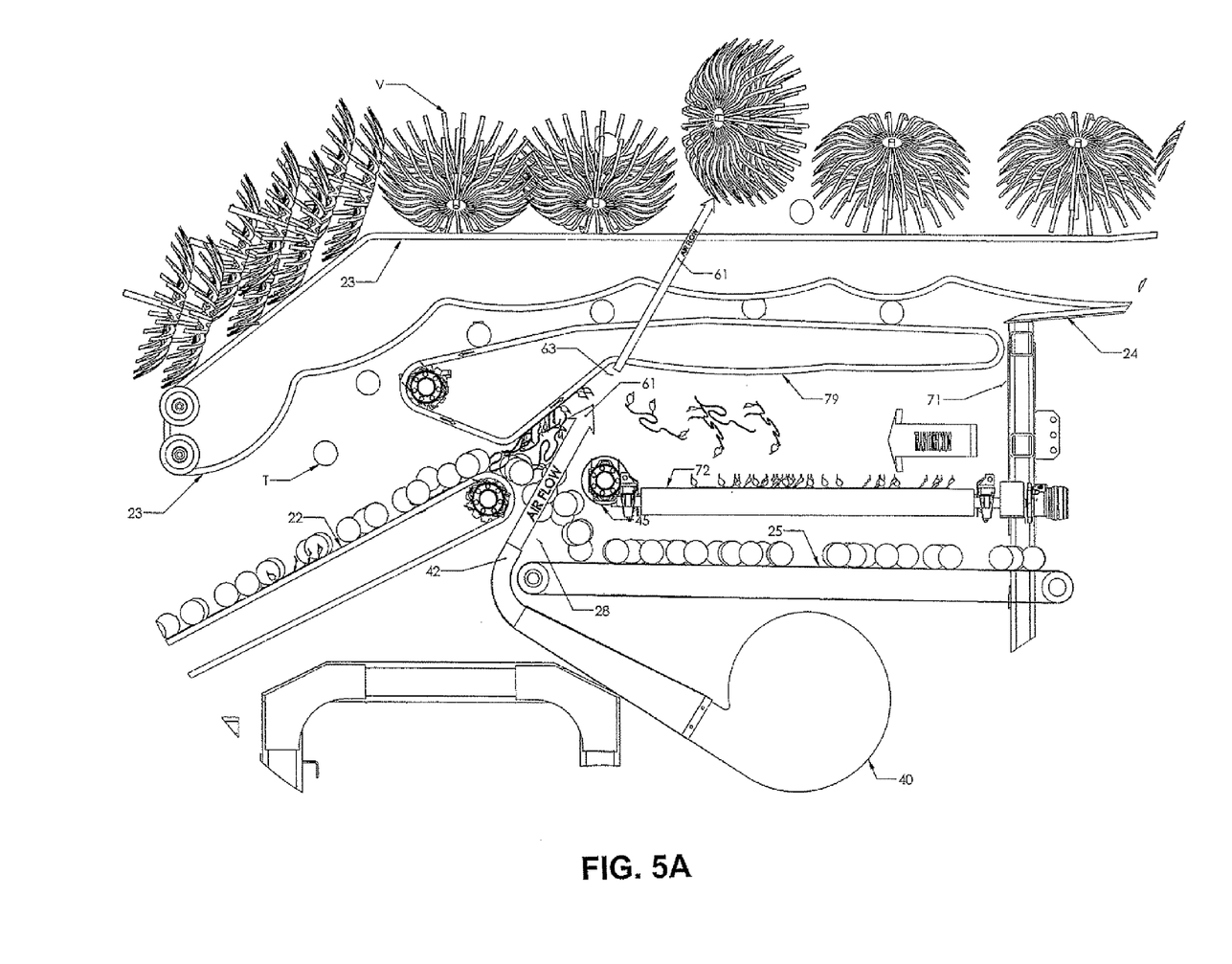
FIG. 5A is a cut away side view along line 5-5 of FIG. 1 of an embodiment of a cleaner of the present invention.
Figure 5B:
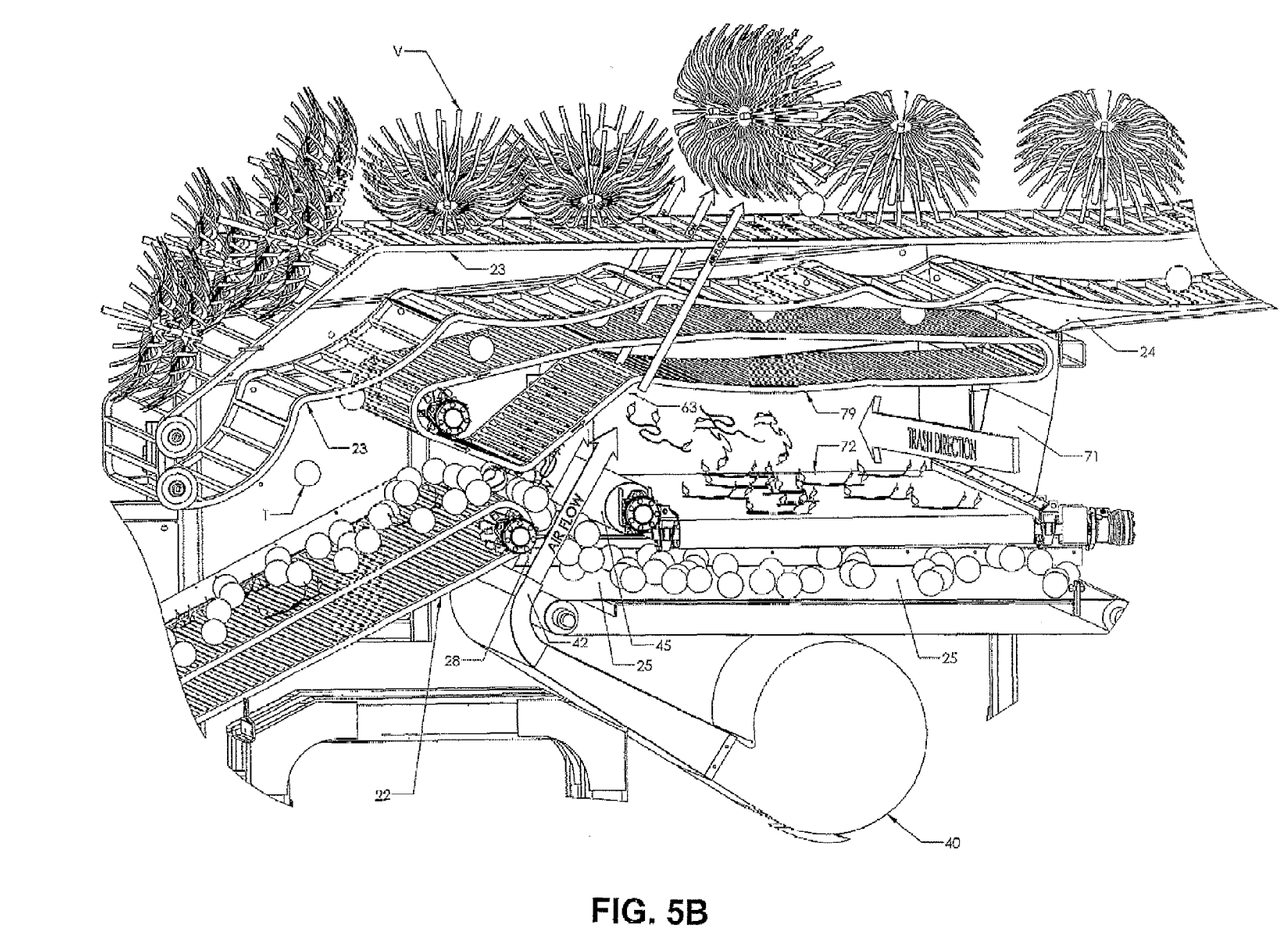
FIG. 5B is a detailed perspective view of the embodiment of FIG. 5A.
Figure 6:
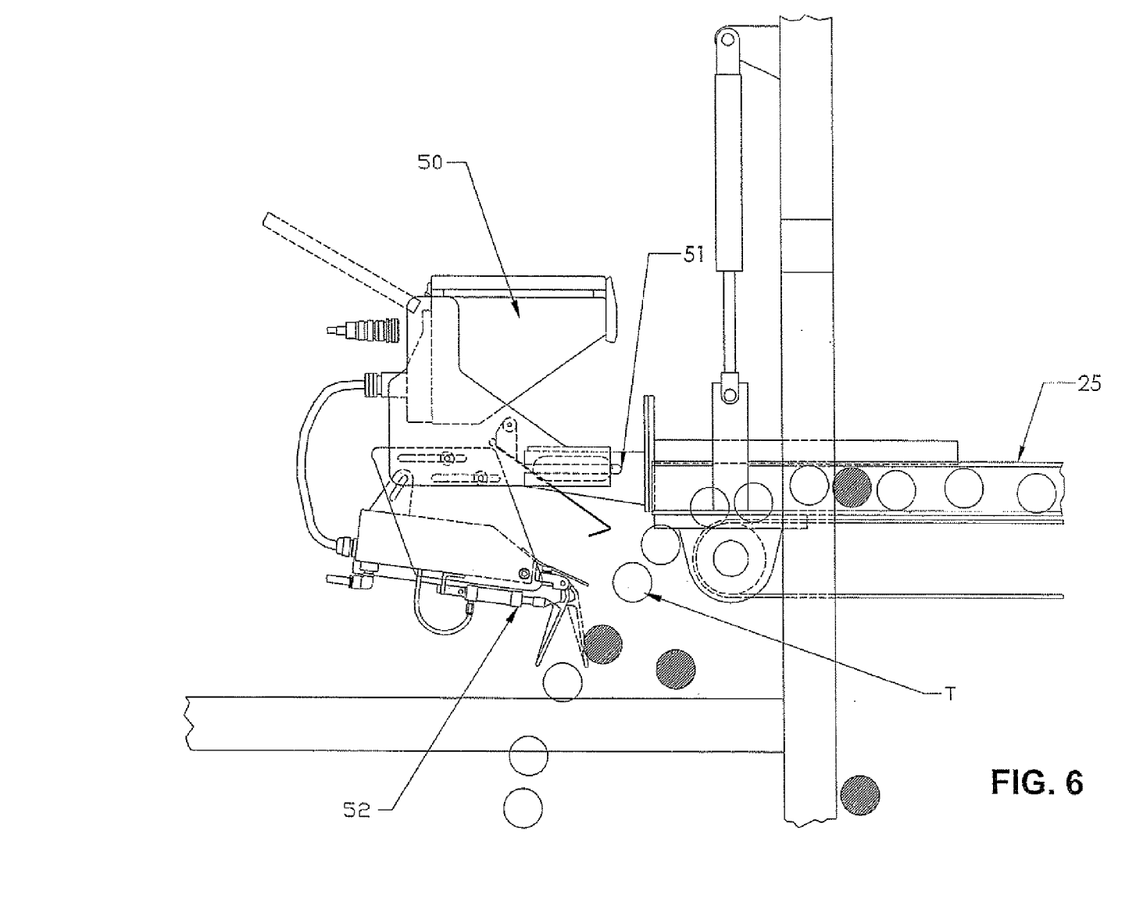
FIG. 6 is a side view of the mechanical fruit sorter of an embodiment of the present invention.
Figure 7:
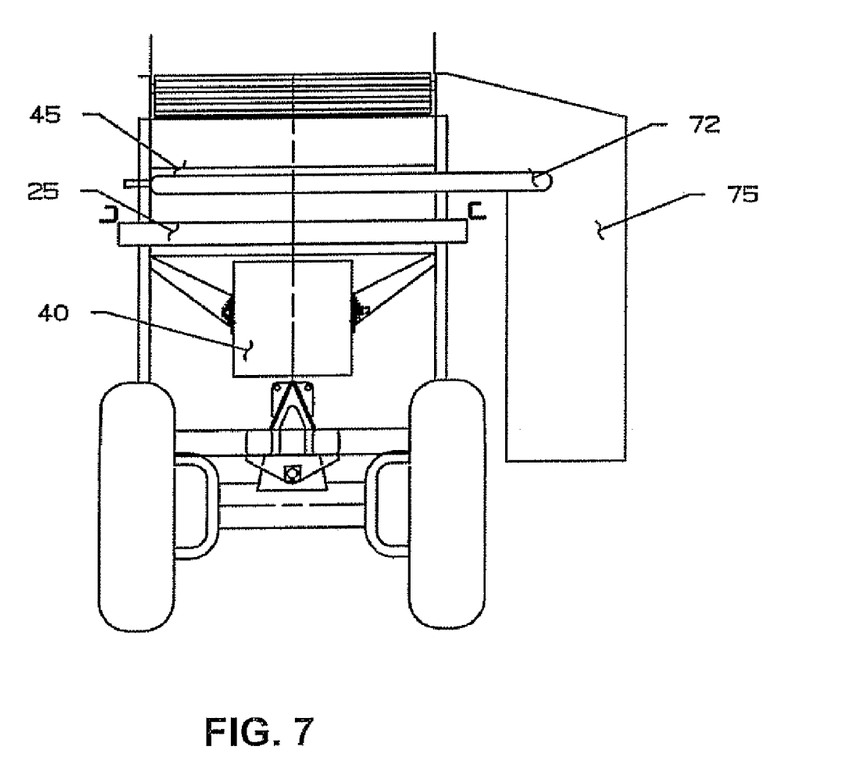
FIG. 7 is a rear view of an embodiment of the present invention.

In the illustrated embodiment of FIG. 4, the sorter conveyor 25 is an endless motor-driven longitudinal conveyor belt traveling toward the rear end of vehicle body 10. Conveyor 25 is positioned near the rear end of fruit conveyor 22, and slightly below it. There is an adjustable gap 28 between the fruit conveyor 22 and the sorter conveyor 25. An air blower 40 is mounted in a lower region of the machine, and has an outlet located below the front end of the sorter conveyor 25 that is directed toward the gap 28 between the two conveyors. This outlet may be provided with an optional nozzle 42 so that the forced air pressure emitted from an optional nozzle 42 in an upwardly blowing airstream 61 contacts the tomatoes T, vegetation, dirt and debris falling from the fruit conveyor 22 onto the sorter conveyor 25. Such forced air pressure may be varied so that it is of sufficient strength to separate vegetation, dirt and debris from the tomatoes T, and force these unwanted materials upward without blowing the tomatoes themselves away. The upwardly blowing air 61, now including unwanted dislodged vegetation, dirt, trash and debris first blows through fruit return conveyor 79, and then through recovery conveyor 23 located above conveyor 79 where it comes into contact with the vines V located thereon and agitates them, as shown in FIGS. 5A-5B. The majority of the unwanted dislodged materials will be trapped by the underside of the fruit return conveyor 79, and drop off to the trash cross 72 above sorter conveyor 25. In some embodiments, a back plate 71 is provided behind and below fruit return conveyor 79 to prevent the dislodged airborne materials from being re-deposited on the cleaned fruit traveling rearward in the machine.

As shown in the illustrated exemplary embodiment, and particularly the perspective view of FIG. 5B, recovery conveyor 23 is an endless motor-driven longitudinal conveyor, the upper surface of which travels toward the rear end of vehicle body 10. Conveyor 23 is made up of segments which provide a plurality of openings or slots that are of sufficient size to allow tomatoes to fall through. It is to be appreciated that the openings or slots of recovery conveyor 23 are larger than those of fruit return conveyor 79. The upwardly blowing airstream agitates the tomatoes T entangled in vines V on the recovery conveyor 23, providing loosening and vibratory motions which further separate the tomatoes T that remain entangled with the vines V on conveyor 23. A recovery shelf track 24 is positioned underneath a rear portion of the recovery conveyor 23 to capture the tomatoes T falling through the slots of the recovery conveyor 23, and, in conjunction with the return movement of the fruit return conveyor 79, transport those tomatoes T back to fruit conveyor 22. It is to be appreciated that recovery shelf track 24 is provided underneath only the rear portion of recovery conveyor 23 so as not to block the upwardly blowing airflow 61 from blower 40 near the front, as best shown in FIG. 5B, in order to allow that air to reach vines V on the top of the recovery conveyor 23.

Figure 8:
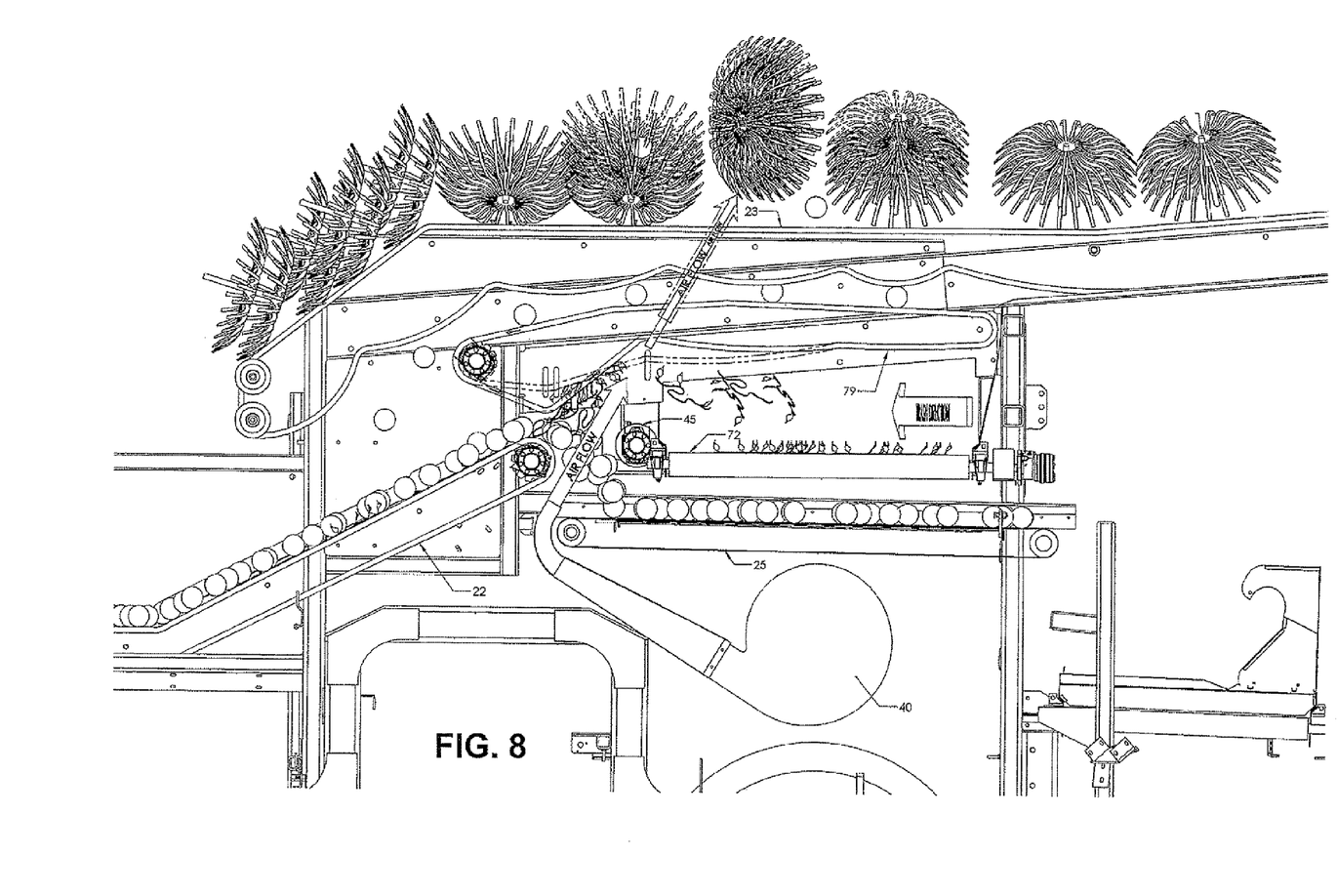
FIG. 8 is a cut away side view of an embodiment of a cleaner of the invention.

FIG. 4 provides a detailed side view of an exemplary embodiment of the air blower 40 and the adjustable fruit return conveyor 79 of the present invention. As shown therein, the nozzle 42 of the air blower 40 is positioned in close proximity to and across the width of gap 28 between conveyor 22 and conveyor 25 so that the forced air pressure 61 emitted through nozzle 42 contacts the tomatoes T, dirt, trash, vegetation and debris traveling across this gap. The position of fruit return conveyor 79 may be adjusted by adjusting the position of rollers 63 so as to change the angle of a portion of conveyor 79 relative to the angle of the upwardly blowing airstream 61, changing the profile of conveyor 79 as air 61 passes through it, as shown in FIG. 8. In FIG. 5A, the angle between conveyor 79 and airflow 61 may be nearly orthogonal in order to maximize the amount of air flowing through the gaps and/or mesh of conveyor 79. This accomplishes both removal of refuse from the tomatoes T, and agitation of the vines on upper recovery conveyor 23. However, as shown in FIG. 4, this angle may be more acute or tangential in order to limit or reduce the amount of air flowing through gap 28, fruit conveyor 79 and recovery conveyor 23. It is to be appreciated that this angle may be adjusted to any suitable angle between zero and 90 degrees, depending on such things as the average size and weight of the crop pieces (e.g. tomatoes T) to be harvested, the dampness of the crop, vines and associated refuse, the relative humidity, air pressure, and other similar factors. Flattening the profile of conveyor 79 above the air stream 61 will allow more air to pass quickly for harvesting in heavy green crops, as shown in FIG. 5A. Taking the profile back to the configuration shown in FIG. 4 will help to throttle the air down for harvesting in dried dead vine conditions. In some embodiments, an additional throttle or dampener may be provided through means of a drapped belt or flap inside conveyor 79 or 23. It is appreciated that variations of flaps and drapped belts may be used in various modes to direct and control the air as required in the field.

As shown in the illustrated exemplary embodiment, a refuse removal conveyor 72 is provided above a portion of sorter conveyor 25 and below a portion of fruit return conveyor 79, as shown in FIG. 4. This surface 72 catches the unwanted materials that have been blown off of the tomatoes T by airstream 61, and, in conjunction with optional back plate 71, prevents this refuse from landing on the cleaned tomatoes T traveling rearward on conveyor 25. Much of this refuse is deflected onto surface 72 from the underside of fruit return conveyor 79 and optional back plate 71. Part of these unwanted materials in the air settle out and are conveyed to the side of the machine by conveyor 72. The lighter materials will likely stay airborne and vent out with the air to the side. In some embodiments, the air may be vented off both sides, with the conveyor 72 split to run both directions.

In some embodiments, additional unwanted refuse may also be deposited onto surface 72 from the action of an optional roller 45 located adjacent to gap 28. The surface of roller 45 is preferably smooth so that it does not become entangled with the vegetation or trash, but it may be provided with teeth, lagging, textured covering or tines to engage such materials if so desired. Roller 45 may rotate in either direction, but preferably in harmony with the airflow 61 so as to remove large pieces of unwanted refuse material moving toward the rear of the machine where they are deposited on the refuse removal surface 72. The refuse removal surface 72 is preferably rough, and may be tilted so that the large pieces of refuse landing on it slide out of the machine and drop to the ground. Surface 72 may be tilted in one direction (right), or the opposite direction (left), or it may have a ridge at the center and tilt in both directions. In alternative embodiments, surface 72 may be smooth and sharply pitched to allow refuse to slide off to one or both sides of the machine. In some embodiments, accommodation for trash collection and directing material to the ground is accomplished with a flexible chute 75 made with flaps to prevent light trash from collecting in the wrong places and causing engine or hydraulic overheating. In preferred embodiments, trash conveyor 72 is a flat belt, not a belted chain.

It is to be appreciated that all of conveyors 15, 19, 22, 23, 25 and 79 are provided along the same vertical plane, and some are operatively positioned above and/or below each other. In this way, the tomatoes T removed from the vines travel along a straight path, moving from the front toward the rear of a machine, being directed only by the conveyors and by gravity. This configuration avoids any left or right turns in the path that the tomatoes T travel through a machine, resulting in better distribution of the tomatoes across conveyor 25 when they reach the sorting stage. Left and fight turns in the paths of other machine cause the tomatoes to roll together into windrows that are more difficult to clean, separate and sort.

In some embodiments, an endless motor-driven transversely oriented output conveyor 26 is positioned near the rear end of conveyor 25. A small gap is provided between conveyor 25 and the output conveyor 26. An optional optical/mechanical crop sorter 50 may be mounted in close proximity to this gap. If used, such a sorter 50 may be any commercially device capable of is selecting or rejecting the severed crop, such as tomatoes T, based upon certain predetermined criteria, such as color. It should also comprise means of separating unwanted tomatoes T based upon their satisfaction of the predetermined criteria, such as a mechanical arm or pivoting gates. It is to be understood that the mechanical sorter 50 may be replaced by, or supplemented with, human sorters who can manually examine the crop on conveyor 26 as they stand on platform 16.

Regardless of the particular examination method utilized, tomatoes T satisfying the predetermined criteria are transported to output conveyor 26, while rejected tomatoes are removed therefrom, either by the mechanical sorter 50 or human sorters. The output conveyor 26 is in communication with the discharging chute 17, which transports the satisfactory tomatoes onto any number of commercially available hoppers, such as a trailer or truck bed 70.

The use of the illustrated exemplary embodiment of the present invention will now be described. If available, the operator inputs a series of predetermined criteria into the mechanical crop sorter 50, which defines the parameters for the 'acceptable' crop to be harvested, in this case tomatoes T. The velocity of the initial airflow 61 for blower 40 is also selected, along with the angle of conveyor 79 relative to airflow 61. These may be changed during processing to provide appropriate removal of debris. The present invention is then positioned before a row of tomato vines V. The adjustable arm 12 is placed in such a manner that the cutting device 14 will sever the tomato vines V at or near ground level. As the present invention proceeds along the row of tomato vines V, cutting device 14 severs the tomato vines V. The pickup mechanism receives the severed tomato vines V (along with loose tomatoes T, dirt clods and debris), and places them onto the pickup conveyor 15. The pickup conveyor 15 then transports the vines V rearward into separator 20.

Inside the separator 20, the tomato vines V are transported over the gap 18 between the pickup conveyor 15 and receiving conveyor 19. As they cross the gap, loose tomatoes T, dirt clods and debris smaller than the width of the gap fall through, and onto the debris conveyor 21. The debris conveyor 21 passes the mixture through a sorting mechanism. Tomatoes T within the mixture are diverted to the fruit conveyor 22, while the dirt clods and debris continue along the debris conveyor 21 to be discarded outside the vehicle body 10.

The tomato vines V upon the receiving conveyor 19 contact the shaker brush 20. As the downward rotation of the shaker brush 20 pulls the tomato vines V underneath the brush, the vibration of the brush tines 31 dislodges the majority of the tomatoes T from the vines V, along with the remaining dirt clods and debris. The dislodged tomatoes T, dirt clods and debris fall onto the fruit conveyor 22, while the vines V (along with any tomatoes T still lodged therein) are deposited by the shaker brush 20 upon the upper recovery conveyor 23.

As the recovery conveyor 23 transports the vines V toward the rear of the vehicle body 10, they are agitated by the upwardly blowing airflow 61. This motion will dislodge additional tomatoes T still entangled in the vines V traveling on recovery conveyor 23. These tomatoes T fall through the slots of the recovery conveyor 23 directly onto fruit return conveyor 79 at the front, onto the recovery shelf track 24 at the rear. The vines V continue rearward until they are ejected from the rear end of the vehicle body 10. The lower return direction of the fruit return conveyor 79 receives the tomatoes T and deposits them upon the fruit conveyor 22, along with the tomatoes T previously dislodged by the shaker brush 20.

The fruit conveyor 22 transports the tomatoes T (and remaining dirt clods and debris) toward the rear end of the vehicle body 10. During this trip, the tomatoes T and refuse cross gap 28 where they encounter upwardly blowing airflow 61 from blower 40. The airflow 61 should be of sufficient volume to cause the tomatoes to "dance," that is, to be moved slightly so that the debris and vegetation around them is removed, while the tomatoes themselves are not. The tomatoes T are then deposited onto sorter conveyor 25 which takes them to the rear of the machine. The air pressure causes the dirt and debris to separate from the tomatoes T and fly upward, where the refuse-laden air encounters the underside of fruit return conveyor 79 and back plate 71. Conveyor 79 generally prevents larger pieces of refuse from going further upward, and back plate 71 prevents them from landing on the cleaned tomatoes at the rear; instead, these deflected pieces drop onto removal conveyor 72 where they transfer out of one or both sides of the machine, optionally through a chute 75. The air passing through fruit return conveyor 79 travels upward where it agitates the vines on recovery conveyor 23, which may loosen tomatoes T located in those vines causing them to drop through the slats of conveyor 23 down onto fruit return conveyor 79 as described previously.

As the tomatoes T reach the rear end of the processing conveyor 25, they may be analyzed by a mechanical fruit sorter 50. Tomatoes T satisfying the particular criteria previously inputted by the operator are transported onto output conveyor 26, while unacceptable tomatoes are discarded out the bottom of the vehicle body 10. The output conveyor 26 may alternatively or additionally transport the acceptable tomatoes T past manual sorters standing on platform 16, and then to the discharging chute 17, where the tomatoes T are placed into storage hoppers 70.

It is to be understood that variations and modifications of the present invention may be made without departing from the scope thereof, and that different combinations of the elements described herein other than those illustrated are also within the scope hereof. It is also to be understood that the present invention is not to be limited by the specific embodiments disclosed herein, but only in accordance with the appended claims when read in light of the foregoing specification.

What is claimed is:

1. A machine for processing vine-borne crops along a path on a vertical plane extending from front to rear inside the machine comprising:
   a. a movable shaker brush provided along said vertical plane;
   b. a removal conveyor provided along said vertical plane having a portion thereof located below said shaker brush for collecting dislodged crops and conveying them rearward along said path, said removal conveyor terminating inside said machine;
   c. a sorter conveyor provided along said vertical plane for conveying dislodged crops rearward along said path, one end of said sorter conveyor adjacent to the termination of said removal conveyor defining a gap therebetween, said gap extending across said path;
   d. a recovery conveyor having a plurality of openings therein provided along said vertical plane adjacent to said shaker brush and above said sorter conveyor for conveying vines rearward along said path;
   e. a fruit return conveyor having a plurality of openings therein provided along said vertical plane below a portion of said recovery conveyor and above a portion of said sorter conveyor for transporting crops dislodged from vines on said recovery conveyor forward along said path to said removal conveyor;
   f. an upwardly blowing airflow passing through said gap to separate unwanted materials from said dislodged crops, said airflow also passing through openings of said fruit return conveyor and through openings of said recovery conveyor for agitating vines on said recovery conveyor; and g. a removal surface provided along said vertical plane below a portion of said fruit return conveyor and above a portion of said sorter conveyor for urging unwanted materials out of at least one side of said machine.

2. The machine of claim 1 further comprising a generally vertically oriented back plate located behind said fruit return conveyor and above said sorter conveyor for deflecting unwanted materials onto said removal surface.

3. The machine of claim 1 further comprising at least one roller for adjusting the angle of a portion of said fruit return conveyor where it is contacted by said airflow.

4. The machine of claim 1 wherein said removal surface is provided on at least one movable conveyor.

5. The machine of claim 1 further comprising at least one roller located adjacent to said gap for transferring unwanted materials onto said surface.

6. The machine of claim 1 wherein said recovery conveyor is a belted chain and said fruit return conveyor is a belted chain.

7. The machine of claim 6 wherein the openings in said recovery conveyor have a size of between about 84 mm and about 120 mm.

8. The machine of claim 6 wherein the openings in said have a size of between about 28 mm and about 36 mm 9. The machine of claim 1 wherein the openings in said recovery conveyor have a size of between about 84 mm and about 120 mm, and wherein the openings in said fruit return conveyor have a size of between about 28 mm and about 36 mm.

10. A machine for processing vine-borne crops along a path on a vertical plane extending from front to rear inside the machine comprising:
   a. a shaker brush provided along said vertical plane;
   b. a removal conveyor provided along said vertical plane having a portion thereof located below said shaker brush for collecting dislodged crops and conveying them rearward along said path, said removal conveyor terminating inside said machine;
   c. a sorter conveyor provided along said vertical plane for conveying dislodged crops rearward along said path, one end of said sorter conveyor adjacent to the termination of said removal conveyor defining a gap therebetween, said gap extending across said path;
   d. a blower generating an upward airflow through said gap to separate unwanted materials from said dislodged crops;
   e. a recovery conveyor provided along said vertical plane adjacent to said shaker brush and above said sorter conveyor for conveying vines rearward along said path;
   f. a fruit return conveyor provided along said vertical plane below a portion of said recovery conveyor and above a portion of said sorter conveyor for transporting crops dislodged from vines on said recovery conveyor forward along said path to said removal conveyor;
   g. a generally vertically oriented back plate located behind said fruit return conveyor and above said sorter conveyor for deflecting unwanted materials onto a removal surface; and
   h. said removal surface provided along said vertical plane below a portion of said fruit return conveyor, above a portion of said sorter conveyor, and in front of said back plate for urging unwanted materials out of at least one side of said machine.

11. The machine of claim 10 further comprising at least one roller for adjusting the angle of a portion of said fruit return conveyor where it is contacted by said airflow.

12. The machine of claim 10 wherein said removal surface is provided on a movable conveyor.

13. The machine of claim 10 further comprising at least one roller located adjacent to said gap for transferring unwanted materials onto said surface.

14. The machine of claim 10 wherein said recovery conveyor is a belted chain and said fruit return conveyor is a belted chain.

15. The machine of claim 14 wherein openings in said recovery conveyor have a size of between about 84 mm and about 120 mm.

16. The machine of claim 14 wherein openings in said fruit return conveyer have a size of between about 28 mm and about 36 mm.

17. The machine claim 10 wherein openings are provided in said recovery conveyor having a size of between about 84 mm and about 120 mm, and wherein openings are provided in said fruit return conveyor having a size of between about 28 mm and about 36 mm.

18. A method for harvesting vine-borne crops along a path on a vertical plane extending from front to rear inside a machine comprising the steps of:
   a. conveying crop-laden vines along a vertical plane and depositing them into a shaker;
   b. shaking said crop-laden vines to dislodge crop therefrom;
   c. conveying said shaken vines away from said shaker along said vertical plane on an upper recovery conveyor having a plurality of openings therein;
   d. conveying said dislodged crop away from said shaker along said vertical plane on a lower conveyor;
   e. directing said dislodged crop across an upwardly directed adjustable high volume of air located along said plane to separate unwanted materials from said dislodged crop;
   f. dislodging additional crop from the shaken vines on said recovery conveyor by directing said high volume of air through openings of said recovery conveyor to agitate said shaken vines;
   g. conveying all of said dislodged crop along said plane to a sorter; and
   h. transferring said unwanted materials out of said machine.

* * * * *